UNITED STATES PATENT OFFICE.

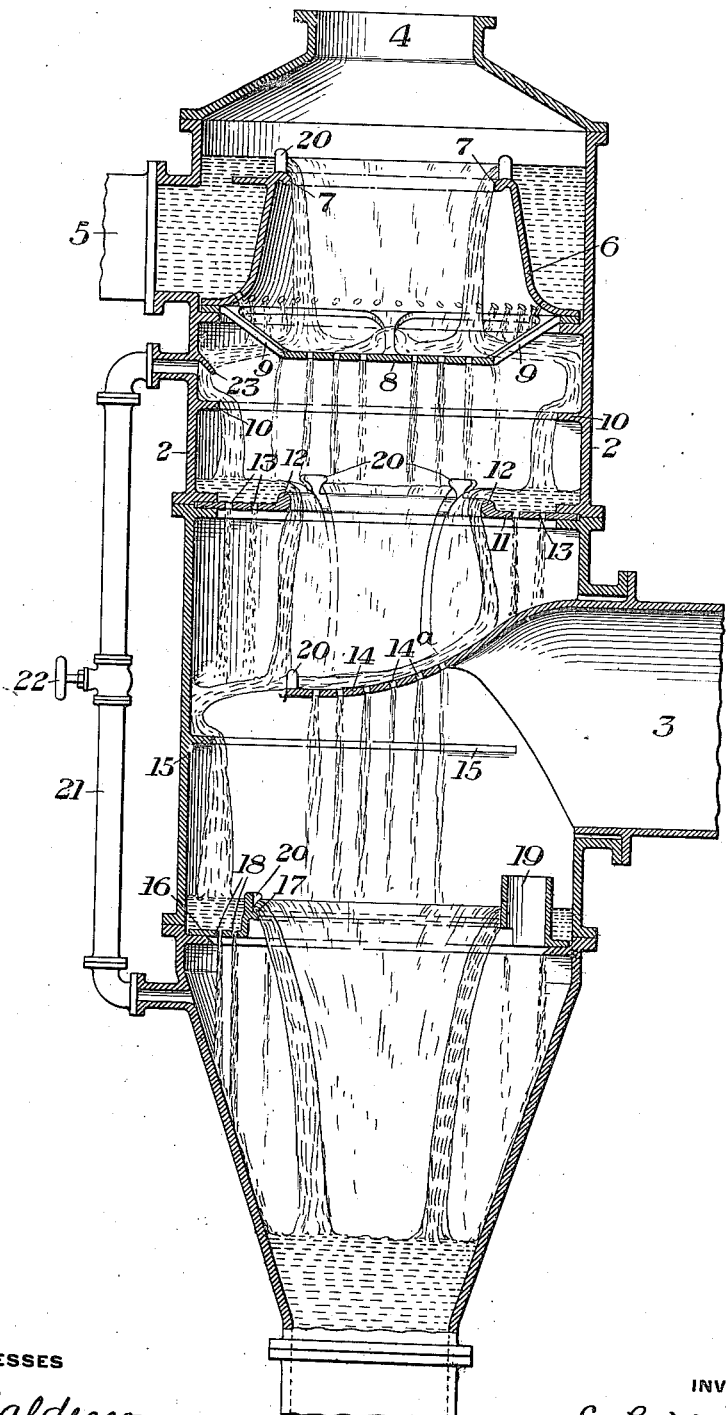

CHARLES L. W. TRINKS, OF PITTSBURGH, PENNSYLVANIA.

BAROMETRIC CONDENSER.

1,028,156.  Specification of Letters Patent.  Patented June 4, 1912.

Application filed October 10, 1911. Serial No. 653,897.

*To all whom it may concern:*

Be it known that I, CHARLES L. W. TRINKS, a resident of Pittsburgh, in the county of Allegheny and State of Pennsylvania, have invented a new and useful Improvement in Barometric Condensers, of which the following is a full, clear, and exact description, reference being had to the accompanying drawings, forming part of this specification, in which the figure is a vertical section of a condenser embodying my invention with the tail broken away.

My invention has relation to barometric condensers of the countercurrent type, and the object of the invention is to increase the efficiency of the condenser by providing means which insure the removal of a maximum amount of air from the cooling water before the latter is heated, and also to provide for thorough mixing of the water and steam, so that the outgoing water will have as nearly as possible the temperature of the incoming steam.

The nature of my invention will be best understood by reference to the accompanying drawings in which I have shown the preferred embodiment thereof and which will now be described, it being premised, however, that various changes can be made in the details of construction and arrangement of the parts by those skilled in the art, without departing from the spirit and scope of my invention as defined in the appended claims.

In these drawings, the numeral 2 designates the walls of the condenser chamber; 3 the steam inlet which enters said chamber at one side intermediate its upper and lower ends; 4 the exhaust connection at the upper end of the chamber to which is attached the usual exhaust pump for exhausting air from the condenser; and 5 the water inlet which opens into the chamber at one side near the upper end thereof.

6 designates a baffle or weir of general frustoconical form, which is placed in the upper portion of the condenser chamber adjacent to the water inlet. This baffle or weir is hollow and is open at its ends, the upper edge being curved inwardly, as shown at 7, to provide a water overflow. Placed below this baffle is a splash plate 8, having a perforated central horizontal portion and being open at its peripheral portion, except for the supporting members 9. A short distance below this splash plate the wall of the condenser is provided with an inwardly extending flange 10, which acts as a reverter for the water in the manner presently described. A short distance below this reverting flange 10 is an annular splash plate 11, having a relatively large central opening, surmounted by an overflow flange 12, and having its annular portion surrounding the opening perforated, as indicated at 13.

The steam inlet pipe 3 has its upper wall 14 flattened and carried inwardly into the condensing chamber in the manner illustrated in the drawing with a portion thereof perforated, as shown at 14ª. A short distance below this extended upper wall of the steam pipe, which acts both as a splash plate for the water and as a deflector for the steam, is another reverting flange 15.

16 designates an annular trough placed some distance below the reverting flange 15 and having an overflow edge 17. The trough 16 has perforations 18 in its bottom, and also preferably has extending therethrough a short vertical pipe 19.

The operation is as follows: Water falling over the upper edge 7 of the weir 6, strikes the splash plate 8, and is deflected with approximately three-fourths of its striking velocity against the lateral walls of the condenser chamber through the open portions 9 of said plate. A portion of the water will also fall through the perforations in the central portion of the plate. The water which is deflected outwardly against the lateral walls of the chamber is again deflected inwardly and downwardly by coming in contact with the reverting flange or ring 10. This flange or ring prevents the water hugging the wall and throws it back into the interior of the vessel in a series of irregular impulses. In the space above the splash plate 8 there is substantially little condensation of the steam, but air separation takes place to a considerable extent. Between the splash plate 8 and the splash plate 11 still more air separation occurs and also more condensation. The water reverted by the annular flange 10 drops into a pool on the annular plate 11. a part of the water falling through the holes 13 and another part flowing over the central edge 12. This overflow edge or weir is preferably rounded with a comparatively large radius. The purpose of this rounding is to prevent the water flowing over it from falling in the form of a converging cone and to cause the water to fall in substantially cylindrical form, as indicated in the drawing. A part of this water strikes the inclined extended wall 14 of the steam inlet pipe and is deflected from it against the opposite wall of the chamber and is reverted by the ring or flange 15. A part of the water, however, falls through the perforations in said plate. When the water strikes the plate 14, it splashes up in the form of fine drops and thus performs one step of the thorough mixing of the steam and water. The principal condensation occurs below the plate 14 by the action of the run of water through the plate, by the water dropping over the edge of the plate and by the water reverted by the ring 15. The shape of the plate 14 is, as illustrated, such that no water can enter the steam pipe. The water leaving the condenser chamber below the plate 14 is quite warm, but is not up to the steam temperature. To increase the temperature of the water still more, an additional cascade is provided by the overflow edge of the trough 16, together with the perforations in the bottom of said trough. The pipe 19 provides means for easy access of the steam to the outer side of the cascade of water flowing over the weir edge 17, steam rushing through this pipe and also down within this cascade by reason of the condensation which occurs.

In order to break up the water flowing over the several weir edges, or flanges, to insure the free escape of air and also to insure the proper passage of steam through the condenser, such weir edges are preferably provided with one or more lugs or projections 20. These lugs act as separators for the water, leaving open spaces through which the steam or air can pass.

More or less air is always mixed with the steam which is removed by the viscous drag or friction of the water. If very much air enters with the steam, this friction is not sufficient to remove all of it. In order to take care of this, I preferably provide a bypass pipe 21, having a regulating valve 22, therein, one end of this bypass communicating with the condensing chamber below the trough 16 and the other end communicating with said chamber a short distance below the splash plate 8. This bypass permits air which may be present in the lower portion of the condensing chamber to be drawn upwardly therethrough and to be removed at the upper portion of the chamber. Any steam which may be drawn up with the air will be condensed by the water adjacent to the upper bypass connection. To insure this, I preferably provide a deflecting flange 23 immediately above the opening of this connection. By means of the valve 22, I am enabled to regulate the size of the bypass opening, and thereby prevent any excess of steam being drawn therethrough.

It will be obvious to those skilled in the art that my invention provides means for insuring a very thorough mixing of the water and steam in a highly effective manner, and that it also provides for the removal of the air from the cooling water before the latter is heated. The condenser, therefore, operates with a high degree of efficiency.

I claim:

1. In a condenser of the counter-current type, an overflow weir in the upper portion of the condenser chamber, and a horizontal splash plate placed below and at such distance from the weir that the horizontal splash will strike the lateral walls of the condenser vessel said plate having ribs for forming predetermined openings in the horizontal splash veil for the upward travel of the non-condensable gases; substantially as described.

2. In a condenser of the counter-current type, an overflow weir in the upper portion of the condenser chamber, and a splash plate below the weir, said plate having ribs for causing predetermined openings in the horizontal splash veil for the upward travel of non-condensable gases said plate having ribs for forming predetermined openings in the horizontal splash veil for the upward travel of the non-condensable gases; substantially as described.

3. In a condenser of the counter-current type, the combination with means for producing a cascade of water, of a steam pipe entering the condenser below such means and having an upper extended portion formed in the shape of a flat splash plate having perforations therein, a reverting flange on the lateral wall of the condenser chamber below the place where the splash from such plate strikes the said wall, and lugs on said plate for causing predetermined openings for the upward travel of non-condensable gases; substantially as described.

4. A condenser of the counter-current type having an annular trough at its lower portion below the steam inlet of the condenser, said trough having an inner overflow edge and a perforated bottom and also having a tubular opening therethrough extending above its water lever into the steam inlet space, and forming means for admitting steam to the outer surface of the water cone formed by the discharge from the inner edge of the trough, substantially as described.

5. A condenser of the counter-current type having means below its steam inlet for producing an annular water cascade, and means for drawing steam and air into the space surrounding said cascade, substantially as described.

6. A condenser of the counter-current type having means below its steam inlet for producing a water cascade, a tubular opening connecting the steam inlet pipe with the outer dead end portion of the condenser chamber below its steam inlet, and means for removing air and vapor from the space surrounding said cascade by a bypass of adjustable size which leads to the coldest and highest vacuum part of the condenser, substantially as described.

7. A condenser of the counter-current type having an annular trough at its lower portion below the steam inlet of the condenser, said trough having an inner overflow edge and a perforated bottom and also having a tubular opening therethrough extending above its water level into the steam inlet space, a flattened splash plate located above said annular trough and arranged to splash the water against the side of the condensing chamber above the trough, said splash plate being also perforated above said tubular opening, and an overflow weir located above the splash plate and acting to discharge water thereon, substantially as described.

8. A condenser of the countercurrent type, having at the upper portion of its condensing chamber a centrally arranged overflow weir, a splash plate below said weir and having a perforated central portion and an open lateral portion, a reverting ring below the splash plate, another splash plate below the reverting ring and having a central overflow and a perforated outer portion, a steam pipe entering the condenser chamber below the last named splash plate and having a portion thereof extended partially across the chamber to form a splash plate, and a reverting ring below such extended portion, substantially as described.

9. A condenser of the countercurrent type, having at the upper portion of its condensing chamber a centrally arranged overflow weir, a splash plate below said weir and having a perforated central portion and an open lateral portion, a reverting ring below the splash plate, another splash plate below the reverting ring and having a central overflow and a perforated outer portion, a steam pipe entering the condenser chamber below the last named splash plate and having a portion thereof extended partially across the chamber to form a splash plate, a reverting ring below such extended portion, and a trough below the last named reverting ring and having an inner overflow edge and a perforated bottom, together with means for permitting steam to come in contact both with the inner and outer sides of the cascade of water flowing over said edge, substantially as described.

10. A condenser of the countercurrent type, having at the upper portion of its condensing chamber a centrally arranged overflow weir, a splash plate below said weir and having a perforated central portion and an open lateral portion, a reverting ring below the splash plate, another splash plate below the reverting ring and having a central overflow and a perforated outer portion, a steam pipe entering the condenser chamber below the last named splash plate and having a portion thereof extended partially across the chamber to form a splash plate, a reverting ring below such extended portion, a trough below the last named reverting ring and having an inner overflow edge and a perforated bottom, together with means for permitting steam to come in contact both with the inner and outer sides of the cascade of water flowing over said edge, and a bypass extending from below the said trough to a point adjacent the first named splash plate, substantially as described.

11. In a countercurrent condenser, the combination with means for producing a cascade of water, of a splash plate below such means, said splash plate having a central opening surrounded by an overflow flange or weir, the edge of said flange or weir being rounded by a curve of relatively large radius, substantially as described.

In testimony whereof, I have hereunto set my hand.

CHARLES L. W. TRINKS.

Witnesses:
JESSE B. HELLER,
GEO. H. PARMELEE.